(No Model.)
C. N. PULSE.
WIRE STRETCHER.
No. 326,919. Patented Sept. 22, 1885.
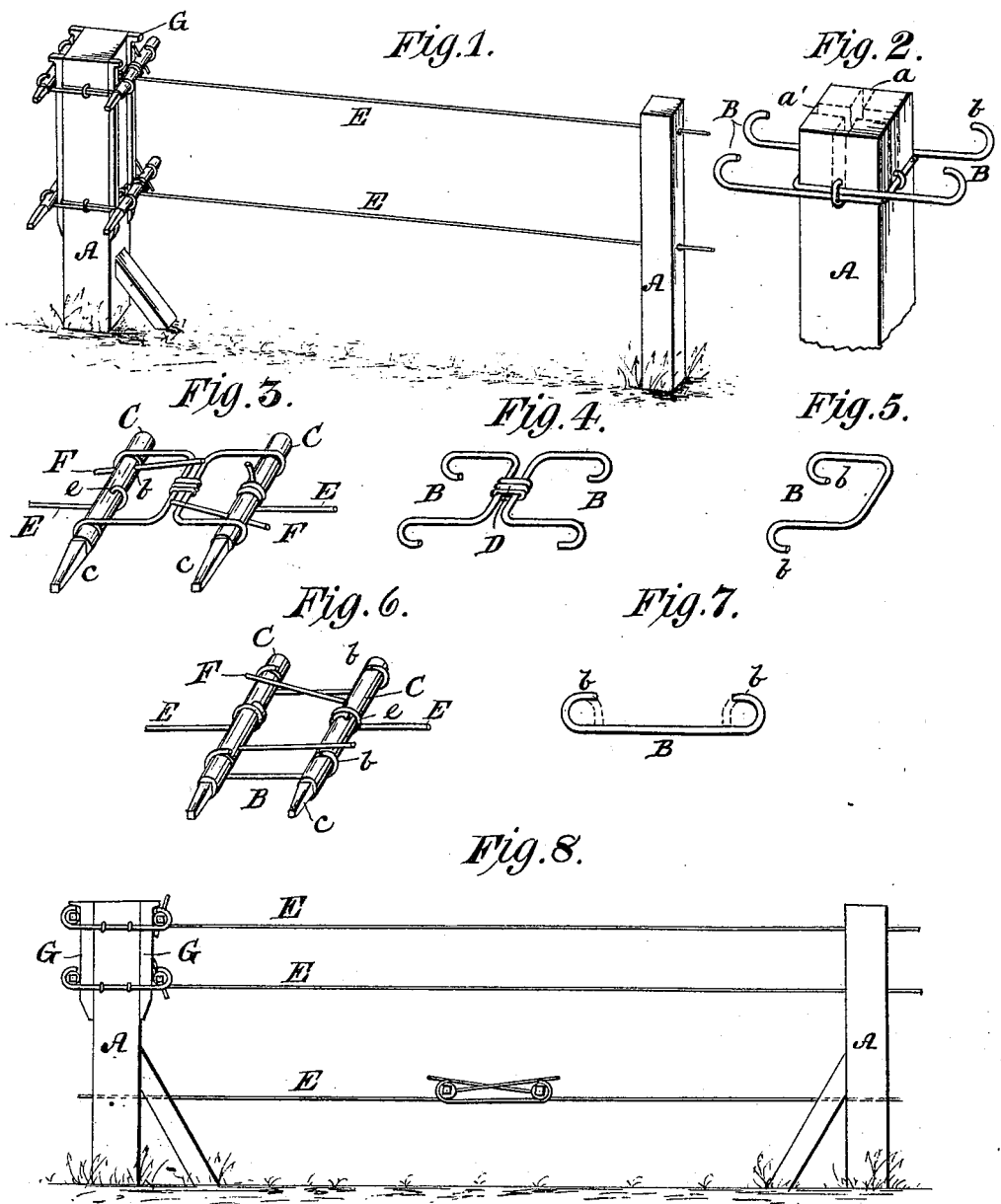
Witnesses
Sam'l R. Turner
P. K. McNickle
Inventor
Charles N. Pulse
By R. S. & A. P. Lacey
Att'ys

UNITED STATES PATENT OFFICE.

CHARLES N. PULSE, OF DODSONVILLE, OHIO.

WIRE-STRETCHER.

SPECIFICATION forming part of Letters Patent No. 326,919, dated September 22, 1885.

Application filed May 19, 1885. (No model.)

*To all whom it may concern:*

Be it known that I, CHARLES N. PULSE, a citizen of the United States, residing at Dodsonville, in the county of Highland and State of Ohio, have invented certain new and useful Improvements in Wire-Stretchers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to improvements in wire-stretchers; and it consists in the peculiar arrangement, construction, and combinations of parts, as more fully hereinafter set forth and described and claimed.

In the accompanying drawings, Figure 1 represents a perspective view of a section of wire fence embodying my improvements. Fig. 2 is an enlarged detail of the windlass-bearing supports, showing their manner of attachment to the fence-posts; Figs. 3 and 6, perspective views of modifications. Figs. 4, 5, and 7 are detail views of parts of the device shown in Fig. 3. Fig. 8 is a side elevation of wire fence provided with my improvements. Fig. 9 shows a modified form of the windlass-bearing support.

My improved device is applicable to the posts of a wire fence, or may be interposed and unite the ends of a wire between its supporting-posts, as shown in Fig. 8.

In the various figures of the drawings, B represents the windlass-supporting arms, formed of a simple bar or wire having hooks $b$ formed upon its opposite ends to support the drums or windlasses $c$. These arms may extend in a straight line and support the adjacent ends of a pair of windlasses, as shown in Figs. 6 and 8, or they may be bent on themselves to form bearings for the opposite ends of a single drum, as shown in the remaining figures. To secure the arms formed as just described to the posts A, they are slipped on the same from opposite directions, the arms embracing their sides, as shown in Figs. 1 and 2, and are secured in place by staples.

When the arms are not bent, they are simply secured to the sides of the posts by staples. When bent and not arranged to bear on or find their resisting points on the opposite faces of the posts, as shown in Figs. 1 and 2, they are united by a link, as D D', Figs. 4 and 9, and seated in keepers $a$ $a'$ cut in the ends of the posts. The link D consists of a wire wrapped around that portion of the bar from which the arms B branch, while the link D' may be a separate bar uniting the two parts; or it may be a single bar having bifurcated ends to form the arms B, as shown in Fig. 9.

While the arms are shown as hooked to form bearings for the windlasses, it is evident that they may be flattened and have eyes formed therein to receive the journals of the windlasses.

In the outer ends of the arms B windlasses C are journaled, one end being formed into a shank, $c$, to receive a wrench or key for turning. An opening, $e$, is formed in the windlasses between the bearings to receive the wires E. When sufficient tension has been put upon the wires by the winding of the wrench upon the windlass, a key, F, is passed through a second opening, $b$, and may bear upon the face of post, or extend and bear on the other windlass, thereby preventing the unwinding and consequent slacking of the taut wire.

When the device cannot conveniently be attached to the post, and where the same is used as a coupler to unite the ends of broken wires, the operation and application of the device may be readily understood by reference to Figs. 3, 6, and 8, in which the wires are simply passed through apertures in the windlasses, and wound thereon, which draws them taut. As the pin F extends from the one to the other windlass, a retrograde movement of the same is prevented.

When the device is applied to the post, sufficient space is left between the face of the post and the end of the hooked supporting-arm to permit the windlasses to be readily removed and easily replaced, thereby allowing an opening to be made in the fence of any desired width. When the windlasses are in place, a key or keeper, G, is inserted in the space between the face of the supports and the windlasses, which prevents the accidental displacement of the latter.

To guard against lateral displacement of the windlasses, the latter may, if desired, be provided with circumferential grooves, to receive the hooks of the supporting-arms, as indicated in Figs. 3 and 6.

When used as a coupler, as indicated in Fig. 8, the ends of the windlass-supporting arms may be bent to form an eye, thus guarding against the accidental displacement of the windlasses, though ordinarily the hooks may be found sufficient.

It is well known that metal rods or bars are subject to linear expansion and contraction under the varying changes of temperature, and a metal bar confined under tension between two unyielding points upon the reduction of its temperature is liable to breakage, owing to the additional strain caused by contraction, and particularly is this the case where the bar or wire is of great length, as in wire fences. By my construction, the supporting-arms for the windlasses being bent to form hooks, the latter, owing to their elasticity, will partially yield when any abnormal strain comes upon the fence wires, and accommodate itself to such strain, which, when removed, the hook will resume its normal position, owing to the elasticity of the metal of which it is formed.

Having thus described my invention, what I claim, and desire to secure by Letters Patent, is—

1. A wire-stretching device consisting of a pair of arms extending in opposite directions having their ends bent to form hooks, windlasses journaled in the hooks of said arms, and a keeper to prevent the retrograde movement of the windlasses, the parts being combined, arranged, and operating substantially as described.

2. A wire-stretching device consisting of the combination of two rods bent on themselves to form stirrups and terminating in hooked bearing-supports and centrally united, windlasses journaled in said hooks, and a keeper to prevent the retrograde movement of said windlasses.

3. A wire-stretching device made in matching sections, each having a pair of supporting-arms branching in the same direction from a transverse bar, and a connecting-link for uniting the sections, in combination with windlasses journaled to said arms, and a keeper to prevent the backward movement of said windlasses, substantially as described.

In testimony whereof I affix my signature in presence of two witnesses.

CHARLES N. PULSE.

Witnesses:
R. MARSH,
M. J. CONRARD.